Patented Oct. 3, 1922.

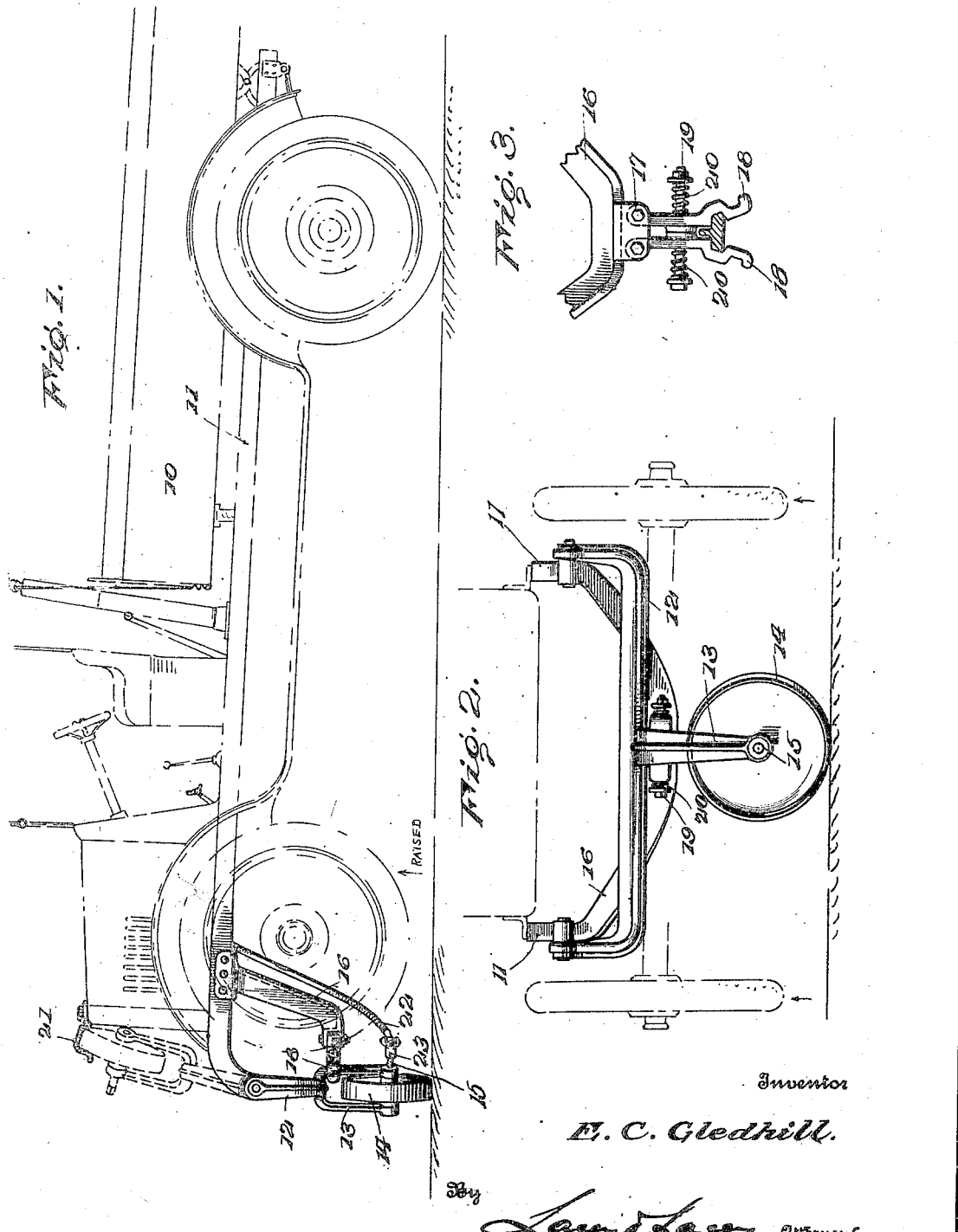

1,430,545

UNITED STATES PATENT OFFICE.

EDWARD C. GLEDHILL, OF GALION, OHIO.

TURNING DEVICE FOR MOTOR VEHICLES.

Application filed July 12, 1920. Serial No. 395,431.

*To all whom it may concern:*

Be it known that I, EDWARD C. GLEDHILL, citizen of the United States, residing at Galion, in the county of Crawford and State of Ohio, have invented certain new and useful Improvements in Turning Devices for Motor Vehicles, of which the following is a specification.

This invention relates to an improved turning device for motor vehicles and has as one of its principal objects to provide a device of this character whereby such a vehicle may be readily turned around within a restricted area.

The invention has as a further object to provide a device whereby one end of the vehicle may simply be swung in an arc for turning the vehicle around and wherein the motive power of the vehicle may be employed for thus swinging the vehicle.

And the invention has as a still further object to provide a device which may be readily employed in connection with various different designs of motor vehicles and which may be operated easily and quickly.

Other and incidental objects will appear hereinafter.

In the drawings:

Figure 1 is a side elevation showing a conventional design of motor vehicle equipped with my improved device.

Figure 2 is a front elevation of the device, and

Figure 3 is a fragmentary plan view showing the clamp employed for securing the supporting wheel of the device in active position.

In order that the construction, mounting and operation of my improved device may be accurately understood, I have, in the drawings, shown the invention in connection with a conventional type of motor truck 10. The side bars of the frame of the truck are indicated at 11. In this connection, it may be stated that the present device is particularly designed for use in connection with motor trucks since it is so often a necessary incident of heavy hauling that a vehicle must be turned around before unloading. However, I do not wish to be limited in this regard since, as will appear as the description proceeds, the present invention may be used with equally good results in connection with other types of motor vehicles.

In carrying the invention into effect, I employ a yoke 12 pivotally connected at its ends in any approved manner to the forward ends of the side bars 11 of the truck frame. Depending from this yoke medially thereof are fork arms 13 and journaled between said arms is a ground wheel 14 carried by a stub shaft 15. Riveted or otherwise secured at its ends to the side bars 11 of the truck frame in the rear of the yoke 12 is a bracket 16 and extending forwardly from this bracket medially thereof are spaced ears 17. Pivoted between these ears are, as particularly shown in Figure 3, companion clamping jaws 18 formed at their outer end portions to engage and fit around the innermost of the fork arms 13 of the yoke and extending freely through said jaws is a bolt 19. Surrounding the end portions of this bolt are springs 20 holding the jaws abutting. Normally, the ground wheel 14 is, as shown in dotted lines in Figure 1 of the drawings, carried in inactive position at the front of the truck and to so dispose this wheel it is simply necessary to swing the yoke 12 upwardly until the wheel lies in front of the engine radiator of the truck. For securing the wheel in inactive position I provide a catch 21 which is suitably connected to the filler tube of the radiator and is disposed to engage over the periphery of the wheel when the yoke 12 is swung upwardly. This catch will, as will be seen, prevent the movement of the wheel against the radiator and will also prevent accidental downward swinging of the wheel.

Attention is now directed to the fact that the ground wheel 14 is, as shown in the drawings, adapted to support the front wheels of the truck clear of the ground. Thus, when the ground wheel is swung downwardly from its inactive position, said wheel will engage the ground some distance in advance of the front wheels of the truck, the yoke 12 then inclining forwardly from the front ends of the side bars 11 of the truck frame. Consequently, by then driving the truck forwardly, the yoke will be moved to its active vertical position for elevating the front wheels of the truck clear of the ground when the clamping jaws 18 will engage the innermost of the fork arms 13 of the yoke for securing the yoke in such position. As will be clear, rotation of the ground wheel will then serve to swing the forward end of the vehicle in an arc for turning the vehicle around and the present invention contemplates that the motive power of the vehicle shall be employed for this purpose. Any approved mechanism may be used for actively coupling the engine to the ground wheel but in the drawing I have shown the provision of a flexible shaft 22 suitably coupled at one end with the engine and equipped at its opposite end with a universal joint which carries a sleeve 23 engageable over the inner end of the stub shaft 15, this shaft being squared at its inner end to coact with said sleeve. Thus, the ground wheel may be readily rotated for turning the truck around while the sleeve 23 may be quickly detached from the stub shaft 15 so that the ground wheel may be swung upwardly to its inactive position. After the truck has been turned around as just indicated, the jaws 18 may be released from the yoke 13, when by driving the truck backwardly a slight distance, the front wheels of the truck will be again lowered into engagement with the ground. This done, the yoke 12 may be manually swung upwardly to engage the ground wheel 14 with the catch 21. It will accordingly be seen that I provide a particularly simple and effective construction for the purpose set forth and a device which may be readily employed in connection with substantially any conventional design of motor vehicle.

Having thus described the invention, what is claimed as new is:

1. The combination with a motor vehicle, of a yoke pivotally connected to the vehicle to swing in a direction longitudinally thereof, a ground wheel carried by said yoke, the yoke being movable to dispose the ground wheel in active position sustaining one end portion of the vehicle elevated, a bracket fixed to the vehicle, and clamping jaws carried by said bracket and operatively engageable with said yoke for securing the ground wheel in active position.

2. The combination with a motor vehicle, of a ground wheel pivotally connected to the forward end portion of the vehicle to swing in a direction longitudinally thereof and movable to a position inclining downwardly in engagement with the ground whereby the vehicle may be propelled forwardly by the tractive effort of the rear wheels thereof for elevating the forward end portion of the vehicle upon said wheel, and means for turning said wheel.

3. The combination with a motor vehicle, of a ground engaging wheel swingingly connected to the forward end portion of the vehicle, said wheel being movable upwardly to inactive position resting against the front of the vehicle and downwardly to active position sustaining the forward end portion of the vehicle elevated, and means for turning said wheel.

4. The combination with a motor vehicle, of a ground engaging wheel swingingly connected to the forward end portion of the vehicle, said wheel being movable upwardly to inverted inactive position resting against the front of the vehicle and downwardly to active position sustaining the forward end portion of the vehicle elevated, means for locking the wheel in inactive position, and means for turning said wheel.

5. The combination with a motor vehicle, of a yoke pivotally connected to the frame bars of the vehicle at their forward end portions to swing thereon in a direction longitudinally of the vehicle, a ground wheel carried by said yoke, means for turning said wheel, and means for locking the yoke against swinging movement.

6. The combination with a motor vehicle, of a yoke pivoted thereon to swing in a direction longitudinally of the vehicle, fork arms carried by said yoke, a ground wheel journaled between said arms, means for turning said wheel, a bracket carried by the vehicle, companion jaws pivoted upon said bracket, a bolt extending freely through both jaws, and springs carried by the bolt urging the jaws toward each other, the jaws being engageable with one of said fork arms for holding the yoke against swinging movement.

In testimony whereof I affix my signature.

EDWARD C. GLEDHILL. [L. S.]